June 10, 1952

S. A. SMITH 2,600,277

SUBMERSIBLE ELECTRIC MOTOR

Filed Jan. 13, 1951

Sidney Arthur Smith, INVENTOR

Kenway, Jenney, Witter & Hildreth
attys.

June 10, 1952  S. A. SMITH  2,600,277
SUBMERSIBLE ELECTRIC MOTOR
Filed Jan. 13, 1951  3 Sheets-Sheet 2
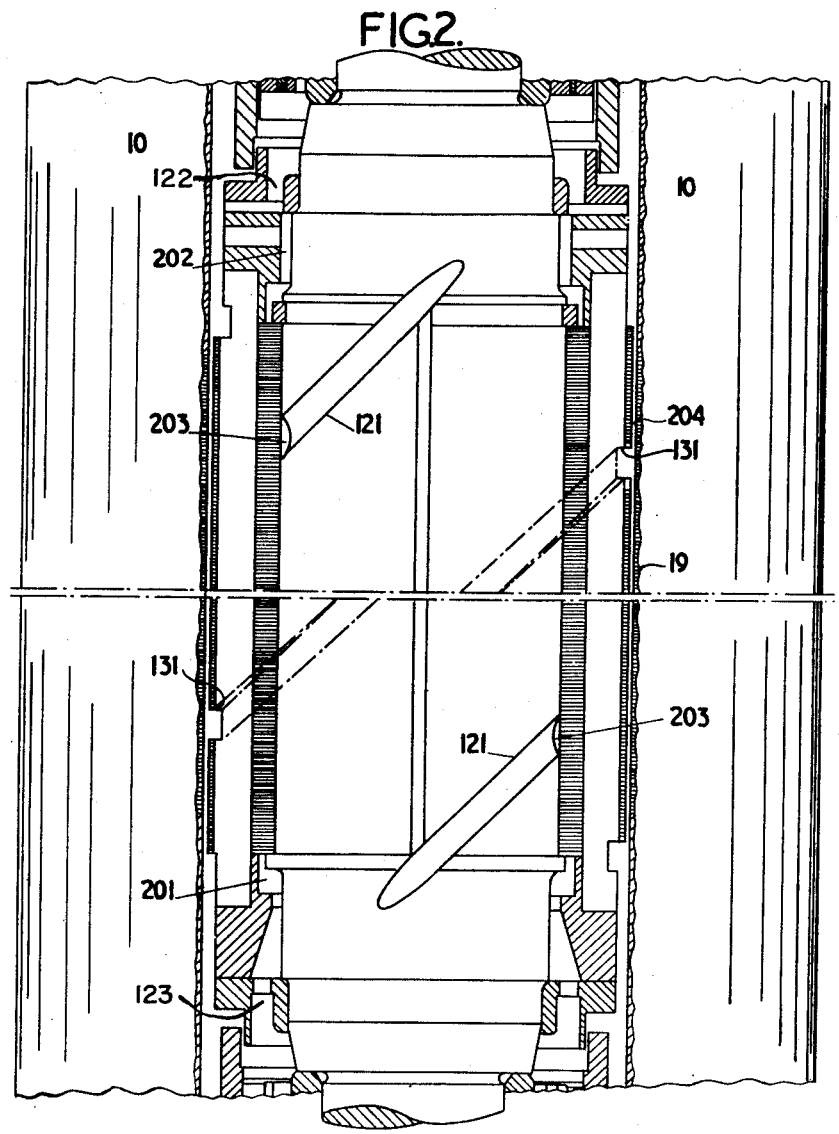

June 10, 1952          S. A. SMITH          2,600,277
SUBMERSIBLE ELECTRIC MOTOR
Filed Jan. 13, 1951          3 Sheets-Sheet 3
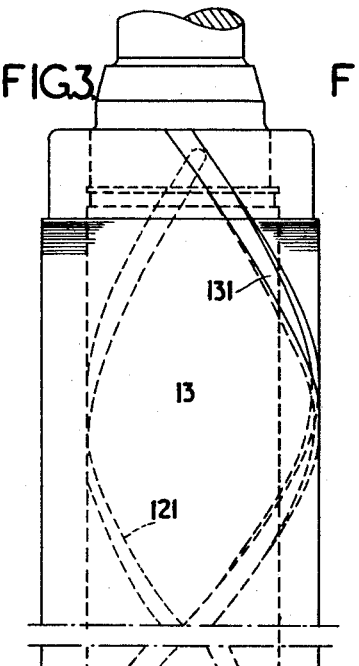
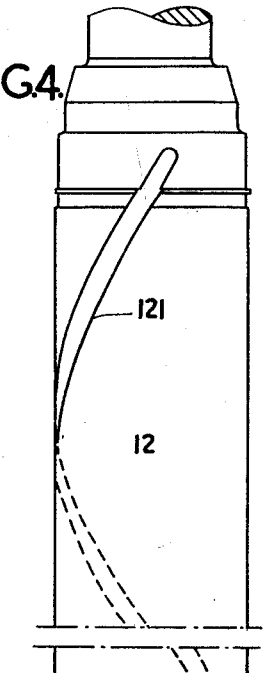
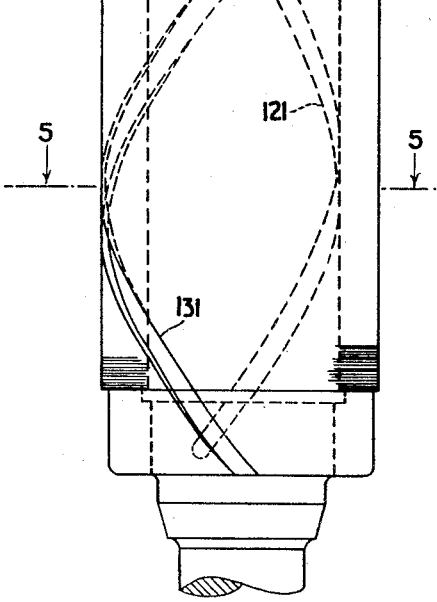

Patented June 10, 1952

2,600,277

UNITED STATES PATENT OFFICE 2,600,277

SUBMERSIBLE ELECTRIC MOTOR

Sidney Arthur Smith, Solihull, Birmingham, England, assignor to James Beresford & Son Limited, Birmingham, England, a corporation of Great Britain Application January 13, 1951, Serial No. 205,880
In Great Britain May 6, 1950

6 Claims. (Cl. 172—36)

This invention has reference to improvements relating to submersible electric motors.

Submersible electric motors generally are of the squirrel cage type and in the larger sizes of such motors particularly, some difficulty is experienced in obtaining efficient cooling, and the present invention has for its object to make provision for ensuring the adequate cooling of submersible electric motors of the squirrel cage type of all sizes in a manner which is capable of being adapted to submersible electric motors of the squirrel cage type of existing design without necessitating any material constructional alteration thereto.

Accordingly, the invention consists of an improved submersible electric motor of the squirrel cage type in which a surface bounding the space between the rotor shaft and the inner periphery of the rotor core is grooved spirally and in which the outer periphery of the rotor core is grooved spirally but with the grooving of opposite hand to the grooving of the surface aforesaid and in which the groovings are open to the spaces through which the coolant is to be circulated whereby when the motor is in operation the rotation of the rotor induces a circulation of coolant in the groovings with the direction of circulation induced in the grooving in a surface bounding the space between the rotor shaft and the inner periphery of the rotor core opposite to the direction of circulation induced in the grooving in the outer periphery of the rotor core, thereby occasioning and ensuring a continuous circulation of coolant through the space between the rotor shaft and the inner periphery of the rotor core and through the space between the rotor and the stator.

An embodiment of the invention will now be described with particular reference to the accompanying drawings which illustrate the invention in its application to a submersible electric motor of the squirrel cage type as incorporated in the well known Beresford submersible electrically driven pump.

In the drawings:

Figure 1 is a conventionalised representation partly in elevation and partly in vertical section of the motor section of a Beresford submersible electrically driven pump incorporating the invention.

Figure 2 is a view partly in elevation and partly in section and on an enlarged scale of the relevant part of the actual constructional form of the electric motor section of a Beresford submersible electrically driven pump incorporating the invention.

Figure 3 is a side elevation of the rotor utilised in the electric motor illustrated in Figures 1 and 2.

Figure 4 is a side elevation of the rotor shaft utilised in the construction of the rotor illustrated in Figure 3.

Figure 5 is a cross section of Figure 3 taken on the plane indicated by the line 5—5 in Figure 3.

In the drawings like numerals of reference indicate similar parts in the several views.

As the general arrangement, construction and manner of operation of the Beresford submersible electrically driven pump is well known it will suffice for present purposes to state that the motor section of the said pump as illustrated in conventionalised form in Figure 1 incorporates:

(a) An outer casing 10 of a non-ferrous metal,
(b) An electric motor of the squirrel cage type having (i) A stator 11 which is associated in fixed relationship with the casing 10,
  (ii) A rotor shaft 12, the upper end portion of which is rotatably mounted in bearings 15, whilst the lower end portion is rotatably mounted in bearings 16, and
  (iii) A laminated rotor core 13 which is mounted on and keyed to the rotor shaft 12, (c) A reservoir 17 for a lubricant and coolant consisting of an emulsion of oil and water, secured to the bottom closure member 101 for the outer casing 10,
(d) A closure member 102 for the upper end of the outer casing which is surmounted by a casing 18 which also surrounds the upper end portion of the rotor shaft 12,
(e) A sleeve 19 which surrounds the core 13 and screens the stator 11,
(f) Passages and spaces for placing the spaces surrounding the rotor shaft 12 and rotor core 13 in communication with the reservoir 17 and with the interior of the casing 18.

According to the illustrated embodiment of the invention the rotor shaft 12 is provided with a right hand spiral groove 121 of semi-circular shape in cross section the lower end of which opens into the space 201 surrounding the lower end portion of the rotor shaft 12, whilst the other end of the said groove 121 opens into the space 202 surrounding the upper end portion of the rotor shaft 12, said groove 121 also being open throughout its length to the space 203 between the outer periphery of the rotor shaft 12 and the inner periphery of the rotor core 13. The right hand formation of the groove 121 ensures that when the rotor shaft 12 is rotated in a clockwise direction looking from the top, circulation of the coolant is induced through the space 203 between the outer periphery of the rotor shaft 12 and the inner periphery of the rotor core 13 in an upwards direction.

The outer periphery of the rotor core 13 is provided with a left hand spiral groove 131 of rectangular shape in cross section which is open throughout its length to the space 204 surrounding the outer periphery of the rotor core 13.

The turns of the groove 121 in the rotor shaft 12 are alternated with the turns of the groove 131 in the outer periphery of the rotor core 13.

The left hand formation of the spiral groove 131 in the outer periphery of the rotor core 13 ensures that when the rotor core is rotated in a clockwise direction looking from the top circulation of coolant is induced through the space 204.

Thus when the motor is in operation there is a continuous circulation of the coolant through the spaces 203 and 204.

If preferred the outer periphery of the rotor shaft 12 and the outer periphery of the rotor core 13 may be provided with more than one groove 121, 131.

Moreover if preferred instead of grooving the outer periphery of the rotor shaft 12 the relevant grooving may be provided in the inner periphery of the rotor core 13.

The rotor shaft 12 is provided with impellers 122, 123, 124 which are turnable therewith, the impeller 122 discharging directly onto the wall of the sleeve 19 slightly above the place of discharge from the groove 121 which also is directed onto the wall of the sleeve 19 (see Figures 1 and 2).

The suction of the impeller 124 is assisted by holes 211 in a stationary part 21.

It should be pointed out that on the assembly of a motor the whole of the interior of the outer casing 10 is filled with coolant as well as the reservoir 17 and that the coolant which fills the space 205 surrounding the upper portion of the rotor shaft 12 and the space 206 surrounding the sleeve 151 which carries the bearings 15 for the upper end of the rotor shaft 12, is caused to circulate downwardly through the space 205 and upwardly through the space 206 by the action of the impeller 122 and the reaction due to the said impeller 122 and the groove 121 discharging coolant directly onto the wall of the sleeve 19 in close proximity.

The manner of circulation of the coolant in the illustrated embodiment of the invention is indicated by the arrows in Figure 1.

It will be appreciated that the invention ensures an efficient and continuous circulation of coolant in the space 203 between the rotor shaft 12 and the inner periphery of the rotor core 13 and in the space 204 surrounding the outer periphery of the rotor core 13 thereby ensuring more efficient cooling than has been attained heretofore.

Furthermore it will be appreciated that the invention is not limited to submersible squirrel cage type electric motors as used in the Beresford submersible electrically driven pump but may be applied to squirrel cage type submersible electric motors of other constructions.

I claim:

1. A submersible electric motor of the squirrel cage type incorporating a liquid tight casing which is required to be filled with a liquid coolant and a rotor comprising a core and a shaft which are enclosed within said casing and which has spiral grooving in the outer periphery of the core of the said rotor and which has spiral grooving in a surface bounding the space between the inner periphery of the said core and the rotor shaft on which said core is mounted, said groovings being of opposite hand with the inlet of the inner grooving and the outlet of the outer grooving opening into the same portion of the liquid filled casing and with the outlet of the inner grooving discharging on to the bounding surface of the casing in proximity to the inlet of the outer grooving whereby, when the motor is in operation, the rotation of the rotor induces a circulation of coolant in the groovings with the direction of circulation induced in the inner grooving opposite to the direction of circulation induced by the outer grooving thereby occasioning and ensuring a continuous circulation through and around the rotor core.

2. A submersible electric motor of the squirrel cage type incorporating a liquid tight casing which is required to be filled with a liquid coolant, a rotor comprising a core and a shaft which are enclosed within said casing and which has spiral grooving in the outer periphery of the core of said rotor and which has spiral grooving in a surface bounding the space between the inner periphery of the said core and the rotor shaft on which said core is mounted, said groovings being of opposite hand with the inlet of the inner grooving and the outlet of the outer grooving opening into the same portion of the liquid filled casing and with the outlet of the inner grooving discharging on to the bounding surface of the casing in proximity to the inlet of the outer grooving and inner and outer passages for circulation of coolant in a part of the casing not occupied by the rotor core with the outlet for the said inner passage adapted to discharge on to the bounding surface of the casing in proximity to the place of discharge of the outlet of the inner grooving aforesaid so that when the motor is in operation the rotation of the rotor induces circulation of coolant in the groovings with the direction of circulation induced in the inner grooving opposite to the direction of circulation induced by the outer grooving thereby occasioning and ensuring a continuous circulation through and around the rotor core whilst the reaction due to the two streams of discharge from the outlet of the inner grooving and the outlet of the inner passage occasions a separate circulation of coolant through the inner and outer passages aforesaid.

3. A submersible electric motor of the squirrel cage type incorporating a liquid tight casing which is required to be filled with a liquid coolant, a rotor comprising a core and a shaft which are enclosed within said casing and which has spiral grooving in the outer periphery of the core of the said rotor and which has spiral grooving in a surface bounding the space between the inner periphery of the said core and the rotor shaft on which said core is mounted, said groovings being of opposite hand with the inlet of the inner grooving and the outlet of the outer grooving opening into the same portion of the liquid filled casing and with the outlet of the inner grooving discharging on to the bounding surface of the casing in proximity to the inlet of the outer grooving whereby when the motor is in operation the rotation of the rotor induces a circulation of coolant in the groovings with the direction of circulation induced in the inner grooving opposite to the direction of circulation induced by the outer grooving thereby occasioning and ensuring a continuous circulation through and around the rotor core and means for assisting in the circulation of coolant to the inlet of the inner grooving.

4. A submersible motor of the squirrel cage type incorporating a liquid tight casing which is required to be filled with a liquid coolant, a well in the lower portion of said casing, a rotor comprising a core and a rotor shaft which are enclosed within the intermediate portion of said casing and which has spiral grooving in the outer periphery of the core of the said rotor and which has spiral grooving in a surface bounding the space between the center periphery of the said core and the shaft on which the said core is mounted, said groovings being of opposite hand with the inlet of the inner grooving and the outlet of the outer grooving in communication with the well aforesaid and with the outlet of the inner grooving discharging on to the bounding surface of the casing in proximity to the inlet end of the outer grooving, inner and outer passages for circulation of coolant in the upper portion of the casing above the rotor core with the outlet for the inner passage adapted to discharge on to the bounding surface of the casing in proximity to the place of discharge of the outlet of the inner grooving, so that when the motor is in operation the rotation of the rotor induces circulation of coolant in the groovings with the direction of circulation induced in the inner grooving opposite to the direction of circulation induced in the outer grooving thereby occasioning and ensuring a continuous circulation through and around the rotor core whilst the reaction due to the two streams of discharge from the outlet of the inner grooving and the outlet of the inner passage occasions a separate circulation of coolant through the inner and outer passages aforesaid and means for assisting flow of coolant under pressure to the inlet of the inner grooving.

5. A submersible motor of the squirrel cage type incorporating a liquid tight casing which is required to be filled with a liquid coolant, a well in the lower portion of said casing, a rotor comprising a core and a rotor shaft which are enclosed within the intermediate portion of said casing and which has spiral grooving in the outer periphery of the core of the said rotor and which has spiral grooving in a surface bounding the space between the center periphery of the said core and the shaft on which the said core is mounted, said groovings being of opposite hand with the inlet of the center grooving and the outlet of the outer grooving in communication with the well aforesaid and with the outlet of the inner grooving discharging on to the bounding surface of the casing in proximity to the inlet of the outer grooving, inner and outer passages for circulation of coolant in the upper portion of the casing above the rotor core with the outlet for the inner passage adapted to discharge on to the bounding surface of the casing in proximity to the place of discharge of the outlet of the inner grooving, means for effecting discharge under pressure from the outlet of the inner passage aforesaid so that when the motor is in operation the rotation of the rotor induces a circulation of coolant in the groovings with the direction of circulation induced in the inner grooving opposite to the direction of circulation induced in the outer grooving thereby occasioning and ensuring a continuous circulation through and around the rotor core whilst the reaction due to the two streams of discharge from the outlet of the inner grooving and the outlet of the inner passage occasions a separate circulation of coolant through the inner and outer passages aforesaid and means for assisting in the circulation of coolant under pressure to the inner end of the inner groove.

6. Submersible electric motor according to claim 1 in which the turns of the inner grooving alternate with the turns of the outer grooving.

SIDNEY ARTHUR SMITH.

REFERENCES CITED

The following references are of record in the file of this patent:

UNITED STATES PATENTS

| Number | Name | Date |
|---|---|---|
| 422,681 | Wray | Mar. 4, 1890 |
| 959,550 | Kingsbury | May 31, 1910 |
| 1,955,955 | Fabrin | Apr. 24, 1924 |
| 2,043,236 | Conant | June 9, 1936 |
| 2,353,336 | Heintz et al. | July 11, 1944 |